United States Patent [19]
Takahashi

[11] Patent Number: 5,663,604
[45] Date of Patent: Sep. 2, 1997

[54] BRUSHLESS MOTOR

[75] Inventor: Shuji Takahashi, Yonago, Japan

[73] Assignee: Nidec Corporation, Kyoto, Japan

[21] Appl. No.: 579,663

[22] Filed: Dec. 27, 1995

[30]     Foreign Application Priority Data

Dec. 28, 1994 [JP] Japan .................. 6-339730
Mar. 31, 1995 [JP] Japan .................. 7-099738

[51] Int. Cl.$^6$ .................. H02K 5/00; H02K 29/00
[52] U.S. Cl. .................. 310/91; 310/67 R; 310/68 R;
310/DIG. 6; 310/89; 310/62
[58] Field of Search .................. 310/90, 91, 62,
310/63, 67 R, DIG. 6, 68 R, 89, 68 D,
68 B

[56]     References Cited

U.S. PATENT DOCUMENTS

| | | | |
|---|---|---|---|
| 3,584,248 | 6/1971 | Higashiro | 310/68 |
| 3,644,765 | 2/1972 | Janson | 310/68 |
| 3,809,935 | 5/1974 | Kristen et al. | 310/68 |
| 4,554,473 | 11/1985 | Mueller | 310/67 R |
| 4,574,211 | 3/1986 | Mueller | 310/68 R |
| 4,603,271 | 7/1986 | Maruyama et al. | 310/62 |
| 4,663,549 | 5/1987 | Suzuki | 310/62 |
| 4,667,122 | 5/1987 | Mueller | 310/68 R |
| 4,703,209 | 10/1987 | Wrobel | 310/67 R |
| 4,800,307 | 1/1989 | Papst | 310/67 R |
| 4,922,148 | 5/1990 | Kitamura | 310/68 D |
| 4,958,096 | 9/1990 | Kachuk | 310/68 E |
| 5,013,104 | 5/1991 | Wrobel | 310/90 |
| 5,278,468 | 1/1994 | Escaravage et al. | 310/68 R |
| 5,325,006 | 6/1994 | Uno et al. | 310/67 R |
| 5,343,104 | 8/1994 | Takahashi et al. | 310/90 |
| 5,357,160 | 10/1994 | Kaneda | 310/67 R |
| 5,430,931 | 7/1995 | Fisher et al. | 310/71 |
| 5,492,458 | 2/1996 | Horng | 310/254 |

*Primary Examiner*—Thomas M. Dougherty
*Assistant Examiner*—Burt Mullins
*Attorney, Agent, or Firm*—McCormick, Paulding & Huber

[57]     ABSTRACT

A brushless motor for use as a fan motor or the like has a housing, a bearing tower provided inside the housing, a stator fixed on a circumference of the bearing tower, a rotor having a shaft rotatably supported by a bearing inside the bearing tower, a rotor magnet provided on the rotor and opposed to the stator, and a circuit base on which a drive control circuit for controlling the rotation of the rotor by controlling a current supplied to the stator is formed. The housing is provided with a supporting plate for supporting the bearing tower. This supporting plate is recessed in an axial direction relative to a bottom surface of the housing, and supports the bearing tower so that the bearing tower projects inwardly from the supporting power in the axial direction. The circuit base is mounted on a surface of the supporting plate opposite from the bearing tower. If this structure is adopted, the overall size of the motor can be reduced while the desired mounting area of the circuit base is maintained.

23 Claims, 6 Drawing Sheets

BRUSHLESS MOTOR

BACKGROUND OF THE INVENTION

1. Field of the Invention

The present invention relates to a brushless motor for use as a fan motor or the like having an internal circuit base.

2. Description of the Related Art

Generally, a radial gap type brushless motor for use as a fan motor or the like has a housing having a supporting plate on its bottom, a cylindrical bearing tower projecting from a central portion of the supporting plate, a stator fixed on a circumferential surface of the bearing tower, a shaft rotatably supported by a bearing inside the bearing tower, a rotor fixed to this shaft and a cylindrical rotor magnet attached to the rotor so as to face a circumferential surface of the stator with a radial gap formed therebetween, and a circuit base on which electronic parts are mounted and which may include a device for detecting the rotational position of the rotor and a circuit for controlling a current for energizing the stator. This circuit base is disposed between the supporting plate and the stator, and coils on the stator are electrically connected to the circuit thereon.

In this kind of brushless motor is a fan motor, an impeller is formed integrally on the rotor. In such a case, a cup-like rotor holder having vanes is molded on the shaft by insert molding, the rotor yoke is then fixed on an inner cylindrical wall surface of the rotor holder, and the rotor magnet is fixed on an inner circumferential surface of the rotor yoke.

Brushless motors having such a construction are disclosed in the specifications of U.S. Pat. Nos. 5,013,957 and 5,343,104 and other documents.

This type of brushless motor, however, has a drawback because there is a need to mount predetermined circuit parts, including a position detecting device, control circuit parts, on the circuit base disposed between the stator and the supporting plate. The circuit base requires a certain mounting area even if the circuit component parts are mounted at a high density. Therefore, if this type of brushless motor is designed to be reduced in size, it is necessary to reduce the size of each component part to achieve a reduction in overall size. However, it is very difficult to do so while maintaining a certain mounting area of the circuit base. In particular, in the case of the fan motors disclosed in U.S. Pat. Nos. 5,013,957 and 5,343,104 and so on, the size of the circuit base cannot be reduced while the outside diameters of the stator and the impeller are reduced for a reduction in overall size, so that the circuit base protrudes outwardly beyond the rotor to partially close the passage for air flow caused by the impeller. That is, it is essentially impossible to manufacture a smaller fan motor by this construction.

The above-described brushless motor, if it is a fan motor, requires manufacturing steps of molding the cup-like rotor holder on the shaft by insert molding and then fixing the rotor yoke and the rotor magnet successively to form the rotor. Therefore, the assembly process is complicated and troublesome operations are required.

SUMMARY OF THE INVENTION

In view of the above-described problem, an object of the present invention is to provide a brushless motor in which the size of the circuit base can be reduced while a certain mounting area is maintained thereon, and which can be reduced in overall size.

Another object of the present invention is to provide a brushless motor particularly improved in the facility with which the rotor is assembled, and in which the rotor can be assembled by simpler or easier operations.

To achieve these objects, according to the present invention, there is provided a brushless motor having a housing, a bearing tower inside the housing, a stator fixed on a circumference of the bearing tower, a rotor having a shaft rotatably supported by a bearing inside the bearing tower, a rotor magnet attached to the rotor and opposed to the stator, and a circuit base on which a drive circuit for controlling the rotation of the rotor by controlling a current supplied to the stator is formed. The housing has a peripheral wall portion having a cylindrical inner space, and a supporting plate formed integrally with the peripheral wall portion through a plurality of arms extending radially inwardly from a bottom surface of the peripheral wall portion, the supporting plate being recessed in an axial direction relative to a bottom surface of the housing. The bearing tower is supported on the supporting plate so as to project upwardly therefrom in the axial direction and the circuit base is mounted on a surface of the supporting plate opposite from the bearing tower.

These and other objects and features of the present invention will become apparent from the following detailed description of preferred embodiments of the invention with reference to the accompanying drawings.

DESCRIPTION OF THE PREFERRED EMBODIMENTS

The present invention will be described below in detail with reference to the accompanying drawings.

Figure 1:
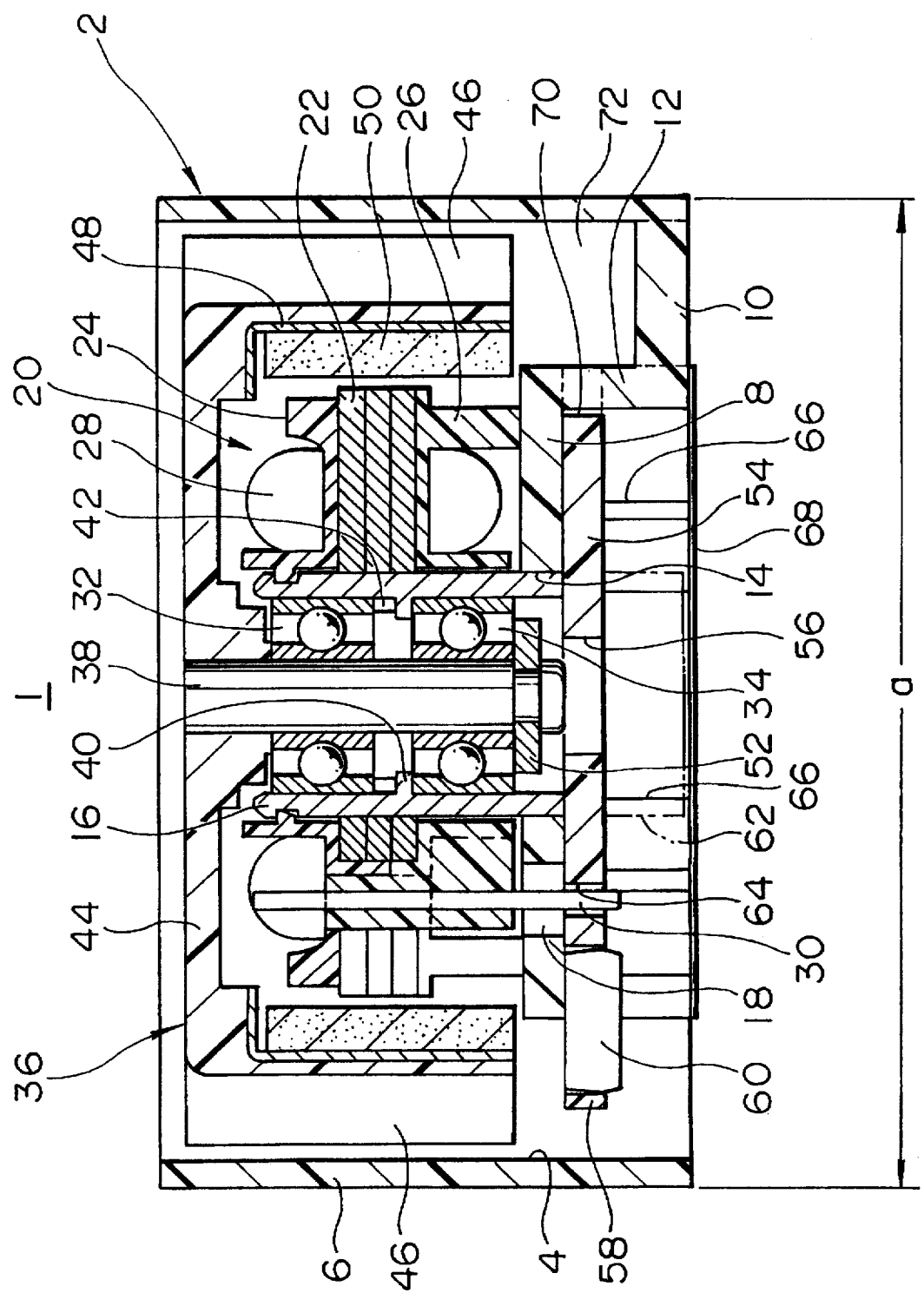
FIG. 1 is an overall cross-sectional view of a first embodiment of the present invention in a fan motor.
Figure 2:
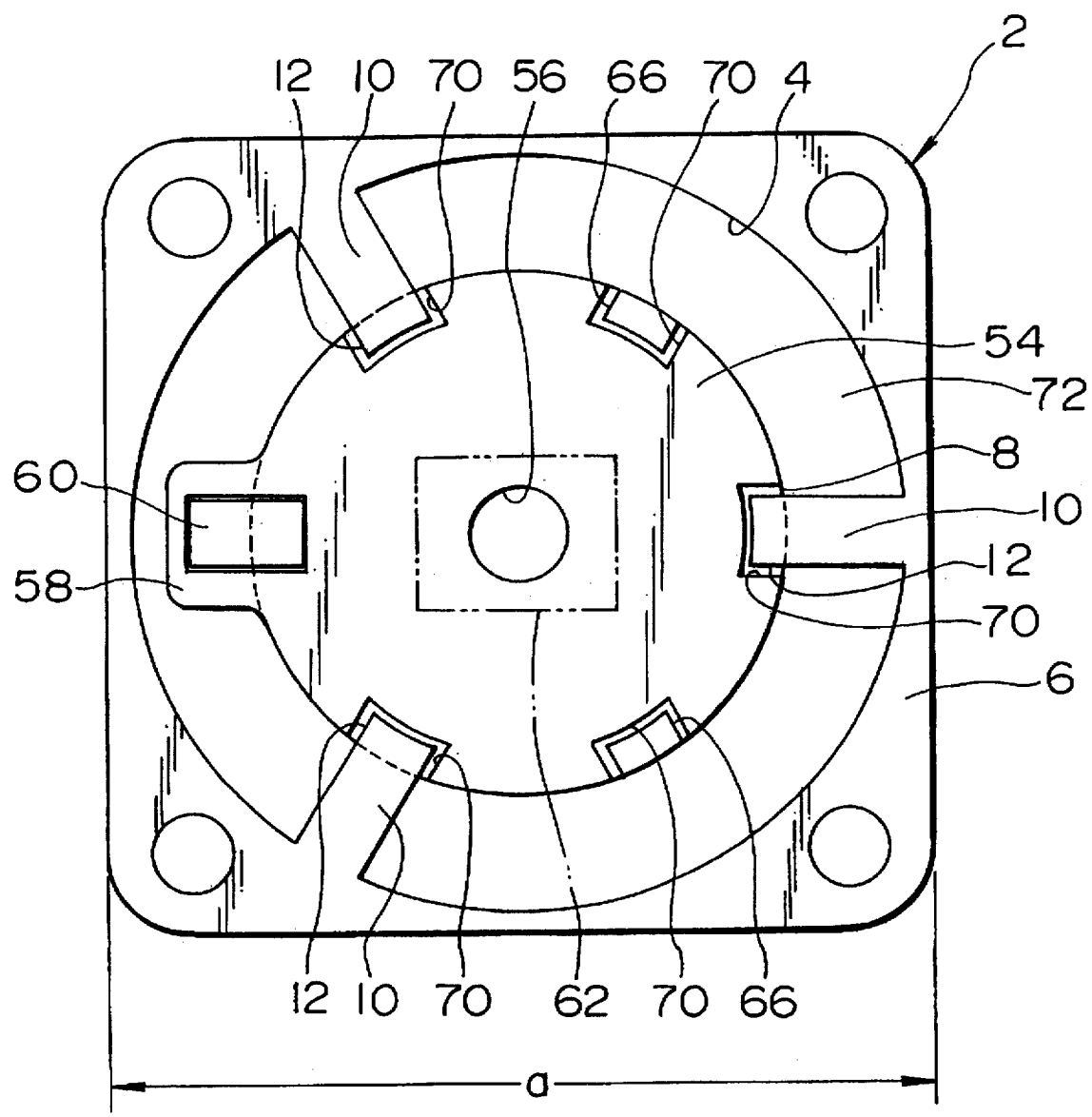
FIG. 2 is a bottom view of the fan motor shown in FIG. 1.

A first embodiment of a brushless motor in accordance with the present invention will be described with reference to FIGS. 1 and 2.

The first embodiment represents an example of an application of the present invention to a fan motor. A housing 2 made of a synthetic resin is provided as an outer casing of a fan motor 1. The housing 2 has a peripheral wall portion 6 which has a cylindrical inner cavity surrounded by its inner cylindrical surface 4, and which has, as viewed in the vertical direction of FIG. 1, a configuration corresponding to a square each side of which has a size a of about 20 mm. The housing 2 also has a generally-circular supporting plate 8 provided inside the peripheral wall portion 6 closer to the bottom end of the same. Three radial arms 10 project radially inwardly from the peripheral end of a bottom opening of the housing 2, and axial extensions 12 connect the inner ends of the arms 10 and the periphery of the supporting plate. These portions are formed of a synthetic resin integrally with each other. The supporting plate 8 forms a downwardly open recess inside a bottom surface of the housing 2.

A circular attachment hole 14 is formed at a center of the supporting plate 8 and a brass cylindrical bearing tower 16 stands upright from the supporting plate 8 with a lower end portion of the tower fixed in the attachment hole 14. In the supporting plate 8 are also formed through holes 18 through which conductive pins are passed. The outside diameter of the supporting plate 8 is approximately equal to the outside diameter of a stator core 22 of a stator 20.

The stator 20 has the core 22 having a lamination structure, an upper insulator 24 and a lower insulator 26 which embrace the stator core 22 in the vertical direction, and coils 28 are wound around the core 22 with the insulators 24 and 26 interposed therebetween. The stator 20 is fixed on the outer circumference of the bearing tower 16 with a portion of the lower insulator 26 engaging the supporting plate 8, the stator 20 thus being supported stably. A plurality of conductive pins 30 are embedded in the lower insulator 26 by molding with their upper and lower ends exposed. Ends of wires of the coils 28 are connected to the upper end portions of the conductive pins 30 by being wrapped therearound. The lower end portions of the conductive pins 30 pass through the holes 18 and project below the supporting plate 8.

A shaft 38 of a rotor 36 is rotatably supported inside the bearing tower 16 by a pair of bearings 32 and 34 which are positioned on an annular projection 40 provided in the bearing tower 16 directly or through a wave washer 42. The rotor 36 forms an impeller and has a shaft 38, a cup-like holder 44, a plurality of vanes 46 formed on an outer surface of a peripheral wall portion of the rotor holder 44, a generally-cylindrical rotor yoke 48 attached to an inner surface of the peripheral wall portion of the rotor holder 44, and a cylindrical rotor magnet 50 attached to an inner circumferential surface of the rotor yoke 48. The rotor holder 44 is formed of a resin integrally with the vanes 46, and a shaft 38 made of a metal is press-fitted in the rotor holder 44 or inserted in the same by insert molding. The shaft 38 is inserted into and passed through the two bearings 32 and 34 inside the bearing tower 16. A washer 52 is fitted to an extreme end portion of the shaft 38 extending out of the bearing 34 to prevent the shaft 38 from coming off. The rotor magnet 50 is opposed to an outer circumferential surface of the stator 20 with a small gap formed therebetween.

A generally-circular circuit base 54 is disposed adjacent to a lower surface of the supporting plate 8. A small opening 56 having such a size that the end of the shaft 38 can be loosely inserted thereinto is formed in the circuit base 54 at a center of the same, but a major part of a lower end opening of the bearing tower 16 is closed by the circuit base 54, thereby maintaining substantially the same mounting area as the conventional art. The circuit base 54 has an outside diameter approximately equal to that of the supporting plate 8. However, as shown in FIG. 2, an attachment portion 58 extending radially outward is formed on a portion of the circuit base 54. A Hall IC 60 for detecting the rotational position of the rotor 36 by detecting the magnetic poles of the rotor magnet 50 is attached to the attachment portion 58. The end of the shaft 38 is loosely inserted into the opening 56 of the circuit base 54 only to a limited depth. A drive IC 62 for controlling energization of the coils 28 is mounted on a lower surface of the circuit base 54 so as to close the opening 56. Pin holes 64 are also formed in the circuit base 54 so as to communicate with the through holes 18 of the supporting plate 8. The conductive pins 30 embedded in the insulator 26 are inserted into the through holes 18 of the supporting plate 8 and the pin holes 64 of the circuit base 54, and portions of the conductive pins 30 extending below the pin holes 64 are soldered to elements in the lower surface of the circuit base 54. The circuit base 54 is brought into abutment against the supporting plate 8 from below, and the conductive pins 30 of the stator 20 fixed on the upper side of the supporting plate 8 are led to the lower side of the circuit base 54 and fixed to the circuit base 54 on the lower surface, thereby firmly fixing the circuit base 54 on the supporting plate 8.

Circuit parts forming a motor drive circuit are mounted on the circuit base 54 along with the above-mentioned Hall IC 60 and drive IC 62. The supporting plate 8 has support columns 66 on the lower surface side of its peripheral end portions between the extensions 12. The support columns 66 project parallel to the extensions 12, and end surfaces of the support columns 66 are formed flush with the bottom surface of the housing 2. A nameplate 68 is attached to the lower surface of end portions of the arms 10 and the lower surfaces of support columns 66 so as to cover the reverse side of the circuit base 54. As shown in FIG. 2, cutouts 70 are formed in a peripheral portion of the circuit base 54 at positions corresponding to the connection extensions 12 and the support columns 66.

The process of assembling the fan motor 1 having the above-described construction will next be described briefly. First, the bearing tower 16 is fixed in the supporting plate 8 of the housing 2 by insert molding. The stator 20 previously assembled is then fitted around the outer circumferential surface of the bearing tower 16. Next, the lower bearing 34 is inserted into the bearing tower 16, the wave washer 42 is inserted into the bearing tower 16 from above, and the upper bearing 32 is successively inserted. The shaft 38 previously set in the motor 36 is inserted into the bearing tower 16 from above and passes through the bearings 32 and 34. The washer 52 is then attached to the shaft 28 to prevent the same from coming off. Next, the circuit base 54 is inserted into the housing 2 from below and brought into abutment against the supporting plate 8. The conductive pins 30 of the stator 20 extending out of the pin holes 64 are soldered to elements in the circuit base 54 on the lower surface thereof, thereby fixing the circuit base 54 in the housing 2 by the conductive pins 30 and the stator 20. Finally, the nameplate 68 is attached to the arms 10 and the support columns 66 of the housing 2. The assembly is thereby completed. The circuit on the circuit base is connected to a lower source to cause magnetic action between the stator 20 and the rotor magnet 50, whereby the rotor 36 rotates.

The first embodiment of the brushless motor (fan motor 1) constructed as described above is characterized by reducing the axial length of the bearing tower 16 to reduce the lengths of the stator 20 and the axial rotor 36 in the direction and the length of other portions relating to the length of the bearing tower 16, and is essentially characterized by bringing the circuit base 54 into abutment against the supporting plate 8 on the lower surface, by setting the outside diameter of the circuit base 54 to a value approximately equal to that of the supporting plate 8, and by forming an area for placing an electronic part at a center of the circuit base 54. That is, a structure is adopted in which the supporting plate 8 of the housing 2 is raised to an inner position in the housing 2, the bearing tower 16 is disposed so to project upwardly from the supporting plate 8, and the circuit base 54 is brought into abutment against the supporting plate 8 from below. The outside diameter of the circuit base 54 is thereby reduced in comparison with the conventional art, but the portion of the circuit base 54 corresponding to the inner portion of the bearing tower 16 can be utilized to maintain the desired component mounting area of the circuit base 54. Moreover, the area for mounting or forming a circuit can be centered in comparison with conventional art, so that the entire structure can be smaller than that in the conventional art. In the above-described structure, an air passage 72 having a suitable volume can be provided below the vanes 46 of the rotor 36 in the housing 2, as shown in FIG. 1, so that there is no problem in performance of the fan. The drive IC 62 is provided at a central position to enable the circuit base 54 to be reduced in size. Also, the opening 56 can be closed by the drive IC 62 to prevent dust or the like from entering the bearing and other portions.

A second embodiment of the brushless motor in accordance with the present invention will now be described.

Figure 3:
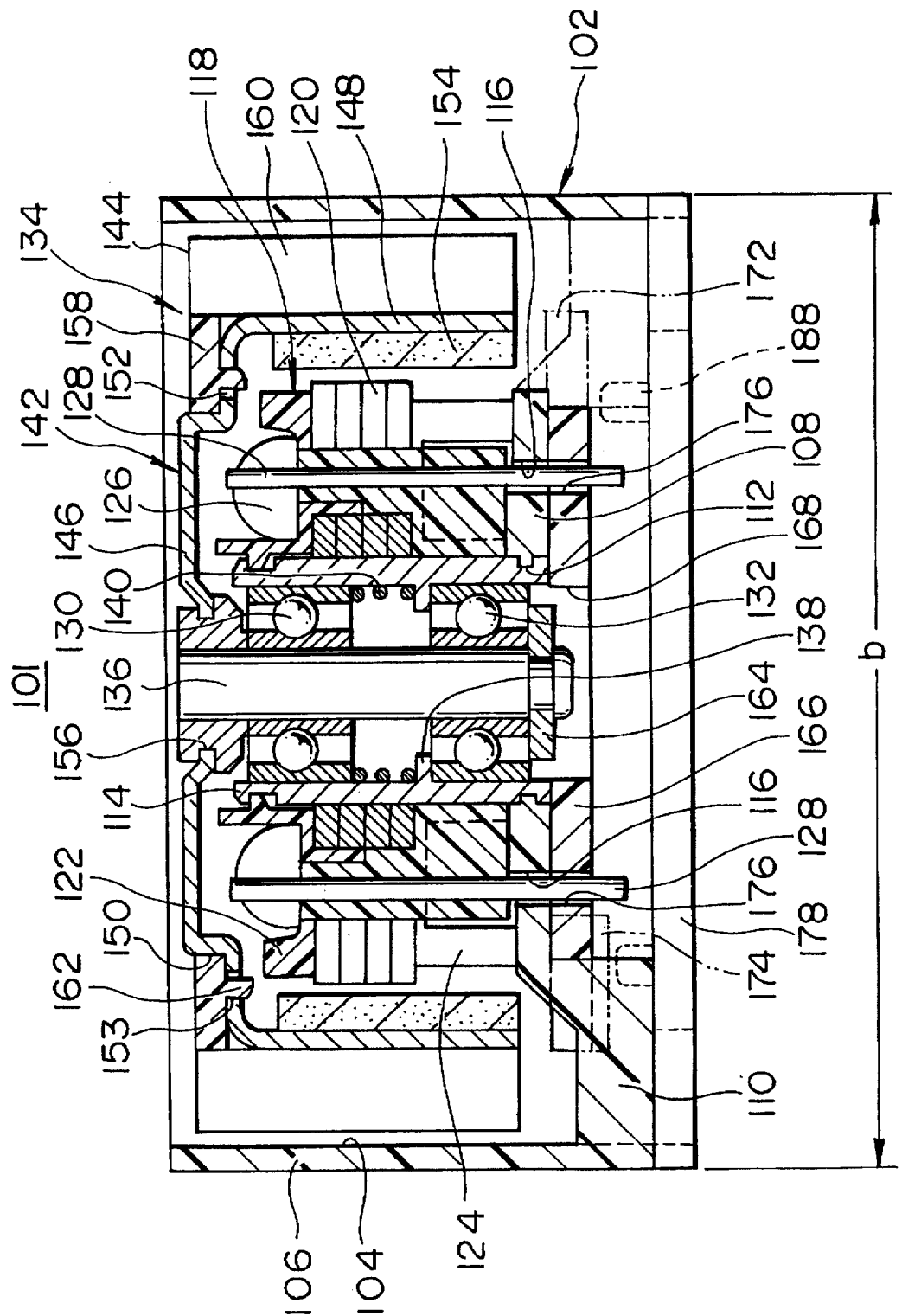
FIG. 3 is an overall cross-sectional view of a second embodiment of the present invention in a fan motor.
Figure 4:
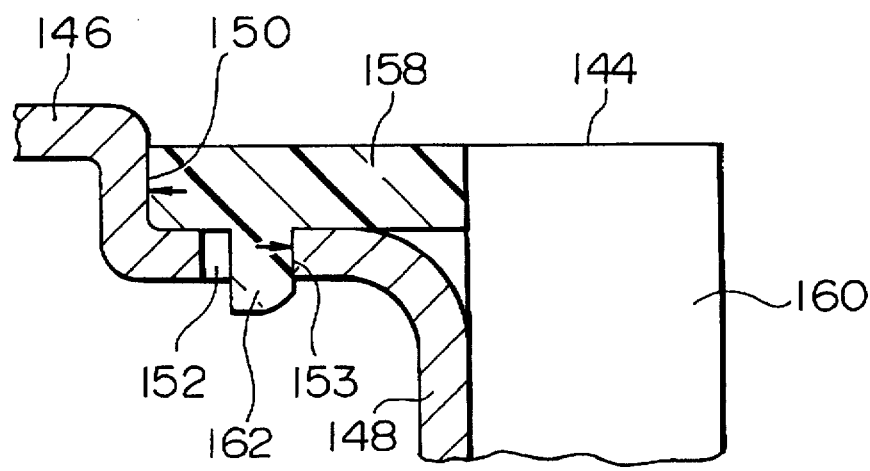
FIG. 4 is an enlarged cross-sectional view of a portion of the fan motor shown in FIG. 3.
Figure 5:
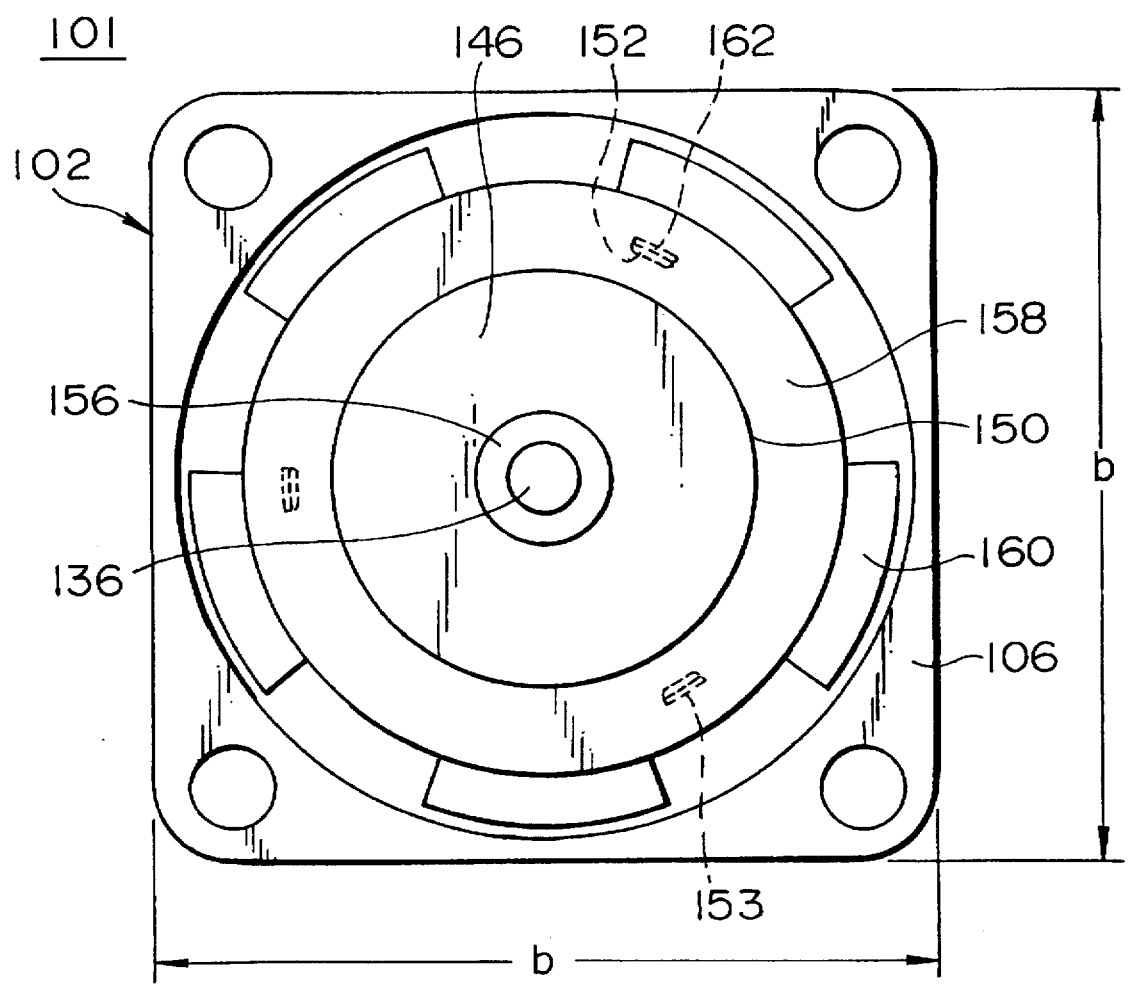
FIG. 5 is a plan view of the fan motor shown in FIG. 3.

The second embodiment also represents an example of an application of the present invention to a fan motor. A housing 102 made of a synthetic resin is provided as an outer casing of a fan motor 101. The housing 102 has a peripheral wall portion 106 which has a cylindrical inner cavity surrounded by inner cylindrical surface 104, and which has, as viewed in the vertical direction of FIG. 3, a configuration corresponding to a square each side of which has a size b of about 20 mm. The housing 102 also has a generally-circular supporting plate 108 provided inside the peripheral wall portion 106 close to but spaced upwardly from the bottom end of the same, and three radial arms 110 projecting radially inwardly from the peripheral end of a bottom opening of the housing 102. These portions are formed of a synthetic resin integrally with each other.

A circular attachment hole 112 is formed at a center of the supporting plate 108. A brass cylindrical bearing tower 114 stands upright above the supporting plate 108 with a lower end portion of the tower fixed in the attachment hole 112. In the supporting plate 108 are also formed through holes 116 through which conductive pins are passed. The outside diameter of the supporting plate 108 is approximately equal to the outside diameter of a stator core 120 of a stator 118.

The stator 118 has a core 120 having a lamination structure, an upper insulator 122 and a lower insulator 124 which embrace the core 120 in the vertical direction. Coils 126 are wound around the stator core 120 with the insulators 122 and 124 interposed therebetween. The stator 118 is fixed on the outer circumference of the bearing tower 114 with a portion of the lower insulator 124 brought into abutment with the supporting plate 108. In this manner, the stator 118 is supported stably. A plurality of conductive pins 128 are embedded in the lower insulator 124 by molding with their upper and lower ends exposed. Ends of lead wires of the coils 126 are connected to the upper end portions of the conductive pins 128 by being wrapped therearound. The lower end portions of the conductive pins 128 pass through the holes 116 and are led out below the supporting plate 108.

A shaft 136 of a rotor 134 is rotatably supported inside the bearing tower 114 by a pair of bearings 130 and 132 which are positioned on an annular projection 138 provided in the bearing tower 114 directly or through a coil spring 140.

The rotor 134 is formed of a yoke 142 forming a rotor holder and a vane unit 144. The rotor yoke 142 is made of a magnetic material and is integrally formed by bending an upper radial member 146 which covers the stator 118 at the upper end of the same and a peripheral member 148 surrounding the circumference of the stator 118. An annular stepped portion 150 is formed in the upper member 146, and elongated engagement holes 152 are formed in the vicinity of the stepped portion 150. A rotor magnet 154 is fixed to an inner circumferential surface of the peripheral member 148. The rotor magnet 154 is positioned so as to be opposed to an outer circumferential surface of the stator 118. An inner circumferential end portion of the upper member 146 of the rotor yoke 142 is supported on a bush 156 fitted around the shaft 136 by engaging with the bush 156. On the other hand, the vane unit 144 is formed of an annular plate portion 158 and a plurality of vanes 160 (five vanes in the illustrated example) fixed on the outer circumferential end of the annular plate portion 158. An inner circumferential portion of the annular plate portion 158 contacts and engages with the annular stepped portion 150 of the upper side member 146. Engaging projections 162 which are fitted into the elongated engagement holes 152 are formed on the annular plate portion 158. The inner circumferential end portion of the annular plate portion 158 is press-fitted to the annular stepped portion 150 with the engaging projections 162 brought into pressure-contact with edge portions 153 of the elongated holes 152. The vane unit 144 is thereby fixed on the rotor yoke 142. The shaft 136 is inserted into and passed through the two bearings 130 and 132 inside the bearing tower 114. A washer 164 is fitted to an extreme end portion of the shaft 136 extending out of the bearing 132 to prevent the shaft 136 from coming off.

Figure 6:
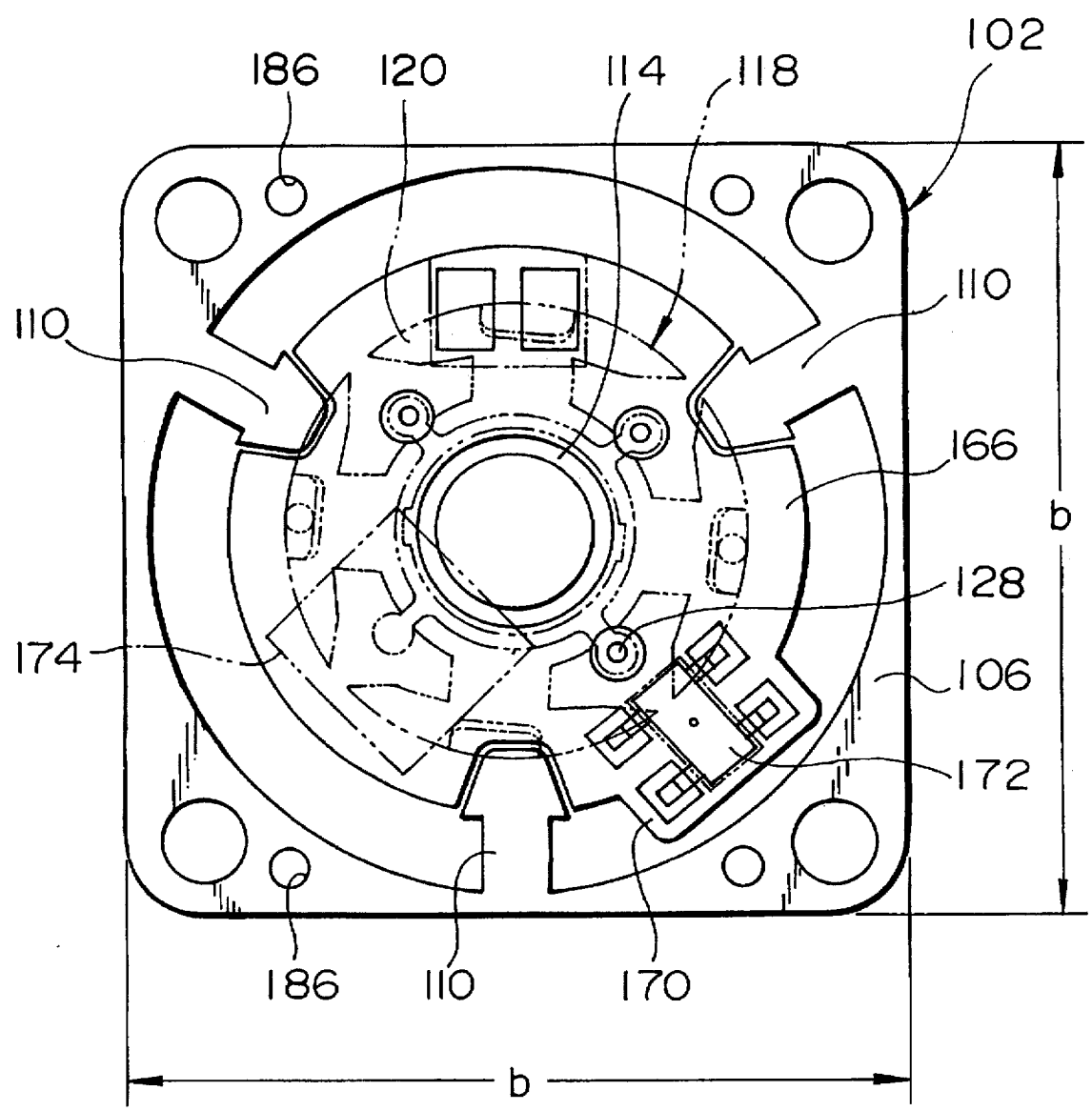
FIG. 6 is a bottom view of the fan motor of FIG. 3 with a cap removed.

A generally-circular circuit base 166 is disposed adjacent to a lower surface of the supporting plate 108. A small opening 168 having such a size that the end of the shaft 136 can be loosely inserted thereinto is formed in the circuit base 166 at a center of the same, but a major part of a lower end opening of the bearing tower 114 is closed by the circuit base 166, thereby maintaining substantially the same mounting area as in conventional art. The circuit base 166 has an outside diameter approximately equal to that of the supporting plate 108. However, as shown in FIG. 6, an attachment portion 170 extending radially outward is formed on a portion of the circuit base 166. A Hall IC 172 for detecting the rotational position of the rotor 134 by detecting the magnetic poles of the rotor magnet 154 is attached to the attachment portion 170. A drive IC 174 for controlling energization of the coils 126 is mounted on a lower surface of the circuit base 166. Pin holes 176 are also formed in the circuit base 166 so as to communicate with the through holes 116 of the supporting plate 108. The conductive pins 128 embedded in the insulator 124 are inserted into the through holes 116 of the supporting plate 108 and the pin holes 176 of the circuit base 166, and portions of the conductive pins 128 extending below the pin holes 176 are soldered to elements in the lower surface of the circuit base 166. The circuit base 166 is brought into abutment against the supporting plate 108 from below, and the conductive pins 128 of the stator 118 fixed on the upper side of the supporting plate 108 are led to the lower side of the circuit base 166 and fixed to the circuit base 166 on the lower surface, thereby firmly fixing the circuit base 166 on the supporting plate 108.

Figure 7:
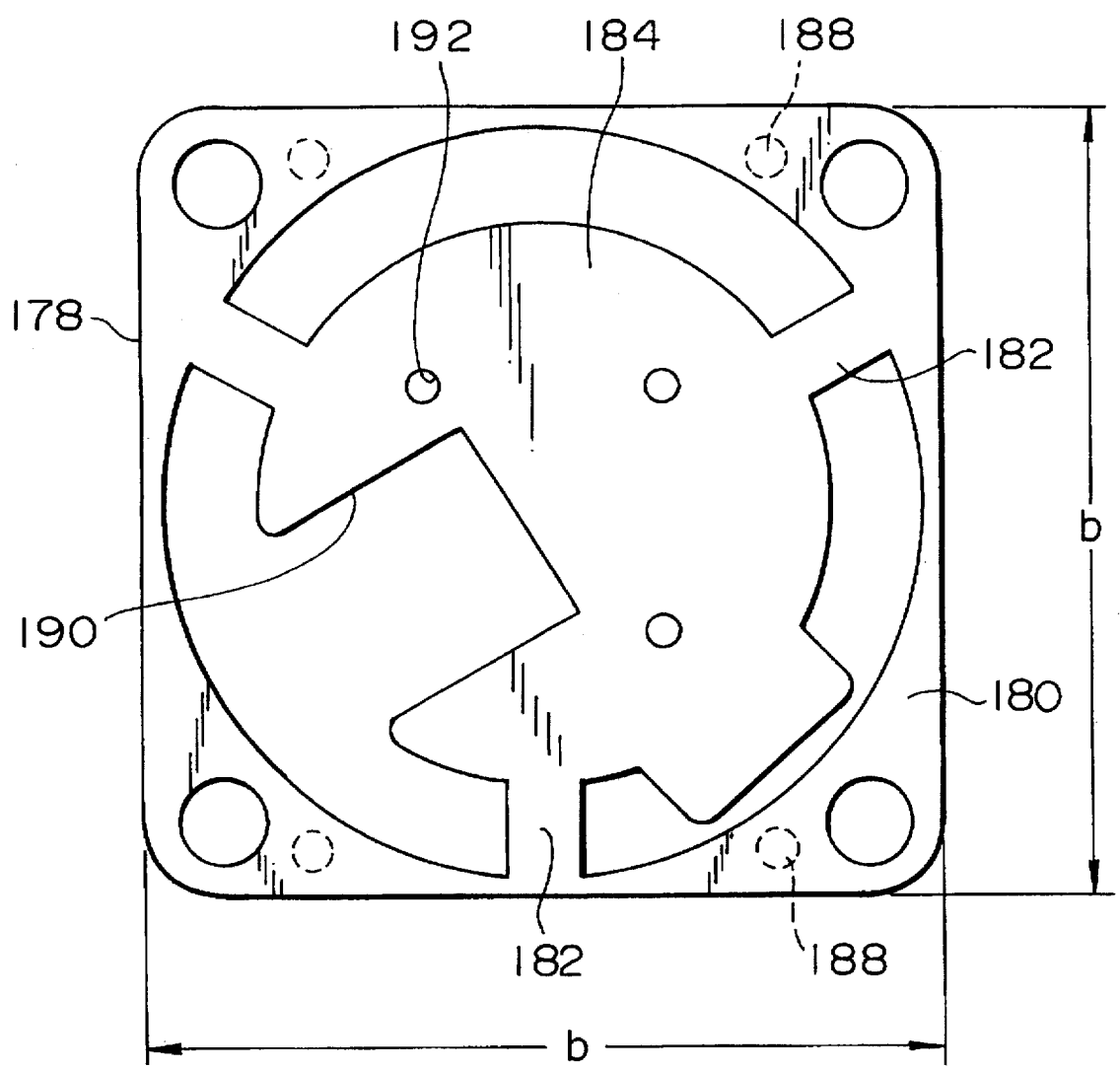
FIG. 7 is a bottom view of the cap in the fan motor of FIG. 3.

A cap 178 formed of a flat plate having the same square configuration as the bottom surface of the housing 102 is attached to the lower surface of the housing 102. As shown in FIG. 7, the cap 178 is formed of a portion 180 corresponding to the bottom surface of the peripheral wall portion 106 of the housing 102, portions 182 corresponding to the arms 110 and a portion 184 corresponding to the circuit base 166. Four connection pins 188 to be fitted to four connection holes 186 formed in the bottom surface of the housing 102 project from the portion 180. The connection pins 188 are fitted to the holes 186 to attach the cap 178 to the housing 102. In the portion 184, a clearance portion 190 for preventing interference with the drive IC 174 and through holes corresponding to the conducive pins 128 are formed.

For the second embodiment of the brushless motor (fan motor 101), a structure is adopted in which the supporting plate 108 of the housing 102 is raised to an inner position in the housing 102, the bearing tower 114 is disposed so to project upward from the supporting plate 108, and the circuit base 166 is brought into abutment against the supporting plate 108 from below. The outside diameter of the circuit base 166 is thereby reduced in comparison with the conventional art, but the portion of the circuit base 166 corresponding to the inner portion of the bearing tower 114 can be utilized to maintain the desired mounting area of the circuit base 166. Further, the rotor 134 is constructed in such a manner that the vane unit 144 is detachably attached to the rotor yoke 142 constituting a rotor holder, thereby enabling the upper wall portion of the rotor holder to be reduced in thickness. As a result, the rotor can be assembled more easily, and the overall size can be reduced without reducing the lamination thickness of the stator core 120. Thus, it is possible to reduce the overall size of the fan motor while achieving the desired magnetic characteristics and maintaining the desired torque of the rotor 134.

Examples of the brushless motor in accordance with the present invention have been described. However, the present invention is not limited to the described examples, and various changes and modifications of the present invention can be made without departing from the scope thereof.

What is claimed is:

1. A brushless motor for use in a fan comprising;
   a housing having a downwardly open cylindrical wall to form a cylindrical inner space and a plurality of arms which extend radially inwardly from a lower end portion of said cylindrical wall;
   a supporting plate connected with said cylindrical wall through said plurality of arms, said supporting plate being retracted in an axial direction from the bottom level of said housing:
   a bearing tower located inside of said housing fixed on said supporting plate so as to project upwardly therefrom in the axial direction:
   a stator fixed on the outer circumferential portion of said bearing tower:
   a rotor having a shaft rotatably supported by a bearing within said bearing tower:
   a rotor magnet attached to said rotor and opposing said stator; and
   a circuit base including a drive circuit for controlling current supplied to said stator, said circuit base being mounted on the lower surface of said supporting plate opposite said bearing tower.

2. A brushless motor according to claim 1, wherein said supporting plate has a circular attachment hole to receive said bearing tower, and said circuit base is disposed to close at least a part of an inner axial opening of said bearing tower.

3. A brushless motor according to claim 2, wherein an opening is formed at a center of said circuit base, to allow an end of said shaft to loosely extend into but not through said opening.

4. A brushless motor according to claim 3, wherein electronic circuit components are mounted on said circuit base so as to close said opening of circuit base.

5. A brushless motor according to claim 1, wherein a space of a predetermined size is formed between the bottom level of said housing and a lower surface of said circuit base, and each of said electronic circuit components which are mounted on the lower surface of said circuit base are accommodated in said space.

6. A brushless motor according to claim 1, wherein said circuit base has a size approximately equal to the size of said supporting plate, and an attachment portion is formed on said circuit base so as to project radially outwardly for mounting a position detecting device, said position detecting device opposing said rotor magnet in the axial direction for detecting magnetic poles of said rotor magnet.

7. A brushless motor according to claim 1, wherein said stator includes a stator core, a pair of insulators embracing said stator core therebetween in the axial direction, and coils wound around said stator core with said pair of insulators interposed between the core and coil.

8. A brushless motor according to claim 7, wherein a plurality of conductive pins are embedded at least in one of said insulators and extend therethrough in the axial direction with upper and lower end portions of said conductive pins being exposed outside of said insulators, said conductive pins being electrically connected to said coils, and a plurality of holes are formed in said supporting plate and said circuit base to allow said conductive pins to pass through said holes of said supporting plate and said circuit base, said conductive pins being connected to said circuit base at the bottom surface thereof.

9. A brushless motor according to claim 8, wherein said conductive pins are embedded in said insulator on the supporting plate side, said insulator on the supporting plate side is in contact with said supporting plate, and said conductive pins pass through said supporting plate and are fixed to the bottom surface of said circuit base to fix said circuit base on said supporting plate.

10. A brushless motor according to claim 8, wherein said upper end portion of said conductive pins also project from said insulators, to the upper side of said stator and end portions of said coils are connected to the upper portions of said conductive pins with the coil being coiled around said upper end portion of said conductive pins.

11. A brushless motor according to claim 1, wherein said rotor includes said shaft which is rotatably supported by said bearing, a cup-shaped rotor yoke which is made of a magnetic material and fixed to an end portion of said shaft, and a vane unit which is attached to said rotor yoke, said rotor magnet is attached to the inner peripheral surface of said rotor yoke to oppose said stator and is formed with an annular step at about the portion thereof where said shaft is fixed to the rotor yoke, the top of said annular plate portion is positioned around the outer circumferential surface of said annular step and said vane unit is fixed on said rotor yoke.

12. A brushless motor according to claim 1, wherein said rotor includes said shaft, a cup-shaped rotor yoke which is made of a magnetic material and is fixed to the upper end portion of said shaft, and a vane unit which has an annular plate portion and a plurality of vanes fixed to said annular plate portion and attached to said rotor yoke, said rotor yoke having an upper covering portion and a cylindrical side wall portion, said upper covering portion covering an upper portion of said bearing tower and said stator, said cylindrical side wall covering a circumference of said stator, said rotor magnet is attached to an inner cylindrical surface of said cylindrical side wall to oppose to said stator, a stepped portion is formed on said upper covering portion to protrude from the level of an upper end portion of said cylindrical side wall to the level of the upper end portion of said shaft in the axial direction, and said vane unit is connected to the rotor yoke at said stepped portion.

13. A brushless motor according to claim 11, wherein said rotor yoke includes a plurality of fitting holes, and said vane unit includes a plurality of a projecting pins, and said projecting pins are received in said fitting holes.

14. A brushless motor according to claim 12, wherein said upper covering portion includes a plurality of fitting holes, and said annular plate portion includes a plurality of a projecting pins, and said projecting pins are received in said fitting holes.

15. A brushless motor according to claim 13, wherein the inner end portion of said vane unit is in contact with the outer circumferential surface of said annular step and pressed radially inwardly to each other, and said projecting pins of said vane unit respectively engage the outer vertical surfaces of said fitting holes and are pressed radially outwardly to each other, forces at said two press-contact portions working in the opposite directions to elastically couple said upper covering portion and said vane unit.

16. A brushless motor according to claim 14, wherein the inner end portion of said vane unit is in contact with the outer circumferential surface of said stepped portion and pressed radially inwardly to each other, and said projecting pins of said vane unit respectively engage the outer vertical surfaces of said fitting holes and are pressed radially outwardly to each other, forces at said two press-contact portions working in the opposite directions to elastically couple said upper covering portion and said vane unit.

17. A brushless motor for use in a fan comprising:

a housing having a downwardly open cylindrical wall to form a cylindrical inner space and a plurality of arms which extend radially inwardly from a lower end portion of said cylindrical wall:

a supporting plate connected with said cylindrical wall through said plurality of arms, said supporting plate being retracted in an axial direction from the bottom level of said housing;

a bearing tower located inside of said housing and fixed on said supporting plate so as to project upwardly therefrom in the axial direction:

a stator fixed on the outer circumferential portion of said bearing tower:

a rotor having a shaft rotatably supported by a bearing within said bearing tower;

a circuit base including a drive circuit for controlling current supplied to said stator, said circuit base being mounted on the lower surface of said supporting plate opposite said bearing tower;

a cup-shaped rotor yoke made of a magnetic material, fixed to an end portion of said shaft and having a rotor magnet which is attached to the inner peripheral surface of said rotor yoke and opposing said stator, said rotor yoke being formed with an annular step at about the portion thereof where said shaft is fixed to said rotor yoke;

a vane unit attached to said rotor yoke, said vane unit being connected to the rotor yoke at said annular step.

18. A brushless motor for use in a fan comprising:

a housing having a cylindrical wall to form a cylindrical inner space and a plurality of arms which extend radially inwardly from a lower end portion of said cylindrical wall:

a supporting plate connected with said cylindrical wall through said plurality of arms, said supporting plate being retracted in an axial direction from the bottom level of said housing;

a bearing tower located inside of said housing and fixed on said supporting plate so as to project upwardly therefrom in the axial direction:

a stator fixed on the outer circumferential portion of said bearing tower;

a rotor having a shaft rotatably supported by a bearing with in said bearing tower:

a circuit base including a drive circuit for controlling current supplied to said stator, said circuit base being mounted on surface of said supporting plate oppositely from said bearing tower;

a cup-shaped rotor yoke made of a magnetic material, fixed to the upper end portion of said shaft, and having an upper covering portion and a cylindrical side wall portion, said upper covering portion covering the upper portion of said bearing tower and said stator, said cylindrical side wall covering the circumference of said stator, said rotor magnet being attached to the inner cylindrical surface of said cylindrical side wall to oppose said stator, a stepped portion being formed on said upper covering portion to protrude from the level of the upper end portion of said cylindrical side wall to the level of the upper end portion of said share in the axial direction;

a vane unit attached to said rotor yoke and having an annular plate portion and a plurality of vanes which are fixed to said annular plate portion, the top of said annular plate portion being positioned around the outer circumferential surface of said stepped portion and said vane unit being fixed on said rotor yoke.

19. A brushless motor according to claim 17, wherein said rotor yoke includes a plurality of fitting holes, and said vane unit includes a plurality of projecting pins, and said projecting pins are received in said fitting holes.

20. A brushless motor according to claim 18, wherein said upper covering portion includes a plurality of fitting holes, and said annular plate portion includes a plurality of projecting pins, and said projecting pins are received in said fitting holes.

21. A brushless motor according to claim 19, wherein the inner end portion of said vane unit is in contact with the outer circumferential surface of said annular step and pressed radially inwardly to each other, said projecting pins of said vane unit respectively engage the outer vertical surfaces of said fitting holes and are pressed radially outwardly to each other, forces at said two press-contact portions working in the opposite direction to elastically couple said upper covering portion and said vane unit.

22. A brushless motor according to claim 20, wherein the inner end portion of said vane unit is in contact with the outer circumferential surface of said stepped portion and pressed radially inwardly to each other, said projecting pins of said vane unit respectively engage the outer vertical surfaces of said fitting holes and are pressed radially outwardly to each other, forces at said two press-contact portions working in the opposite directions to elastically couple said upper covering portion and said vane unit.

23. A brushless motor according to claim 1, wherein each of said arms has a first portion and a second portion, said first portion extends radially inwardly from the bottom end portion of said cylindrical peripheral wall and said second portion extends generally vertically upwardly form the inner end portion of said first portion.

* * * * *